United States Patent
Karlinsky et al.

(10) Patent No.: US 10,796,203 B2
(45) Date of Patent: Oct. 6, 2020

(54) OUT-OF-SAMPLE GENERATING FEW-SHOT CLASSIFICATION NETWORKS

(71) Applicant: International Business Machines Corporation, Armonk, NY (US)

(72) Inventors: Leonid Karlinsky, Mazkeret Batya (IL); Mattias Marder, Haifa (IL); Eliyahu Schwartz, Haifa (IL); Joseph Shtok, Haifa (IL); Sivan Harary, Haifa (IL)

(73) Assignee: International Business Machines Corporation, Armonk, NY (US)

(*) Notice: Subject to any disclaimer, the term of this patent is extended or adjusted under 35 U.S.C. 154(b) by 119 days.

(21) Appl. No.: 16/206,528

(22) Filed: Nov. 30, 2018

(65) Prior Publication Data
US 2020/0175332 A1 Jun. 4, 2020

(51) Int. Cl.
*G06K 9/62* (2006.01)
(52) U.S. Cl.
CPC .................. *G06K 9/6257* (2013.01)
(58) Field of Classification Search
CPC .................................................. G06K 9/6257
USPC ....................................................... 382/159
See application file for complete search history.

(56) References Cited

U.S. PATENT DOCUMENTS

| | | | | |
|---|---|---|---|---|
| 7,769,759 B1 * | 8/2010 | Gartung | ............... | G06F 16/353 707/737 |
| 9,141,881 B2 | 9/2015 | Jiang et al. | | |
| 10,043,071 B1 * | 8/2018 | Wu | ..................... | G06K 9/00456 |
| 2004/0111453 A1 * | 6/2004 | Harris | .................. | G06K 9/6269 708/200 |
| 2015/0117764 A1 | 4/2015 | Zhu et al. | | |
| 2018/0041536 A1 * | 2/2018 | Berlin | ..................... | G06N 3/08 |
| 2019/0080453 A1 * | 3/2019 | Song | .................. | G06K 9/00147 |
| 2019/0354805 A1 * | 11/2019 | Hind | ..................... | G06K 9/6269 |
| 2020/0097820 A1 * | 3/2020 | Song | ........................ | G06N 3/08 |

OTHER PUBLICATIONS

Zhongwen Xu, Linchao Zhu, Yi Yang, "Few-Shot Object Recognition from Machine-LabeledWeb Images," arXiv:1612.06152v1 [cs.CV] Dec. 19, 2016, 10 pages.

* cited by examiner

*Primary Examiner* — Juan A Torres
(74) *Attorney, Agent, or Firm* — Patterson + Sheridan LLP (57) ABSTRACT

Embodiments of the present disclosure include training a model using a plurality of pairs of feature vectors related to a first class. Embodiments include providing a sample feature vector related to a second class as an input to the model. Embodiments include receiving at least one synthesized feature vector as an output from the model. Embodiments include training a classifier to recognize the second class using a training data set comprising the sample feature vector related to the second class and the at least one synthesized feature vector. Embodiments include providing a query feature vector as an input to the classifier. Embodiments include receiving output from the classifier that identifies the query feature vector as being related to the second class, wherein the output is used to perform an action.

20 Claims, 7 Drawing Sheets

OUT-OF-SAMPLE GENERATING FEW-SHOT CLASSIFICATION NETWORKS

BACKGROUND

The present invention relates to improved classification of data, and more specifically, to automatically augmenting training data sets for a classifier with synthesized data.

Data classification is becoming an increasingly prominent in computer systems. For instance, techniques for automatically classifying images, audio, video, text, and other forms of content are becoming more common as the sizes of data sets grow. Generally, such classification techniques involve determining that an unknown example belongs to a class based on known examples of the class. As such, these techniques rely upon large sets of known examples of classes for accuracy.

When few examples are known for a class, it is particularly difficult to recognize the class in unknown examples. For instance, facial recognition in a crowded image may be challenging using a system that is trained based only on a small number of known images of a particular person. As such, there is a need in the art for improved techniques for classifying data based on a limited number of known examples of a class.

SUMMARY

According to one embodiment of the present invention, a method includes training a model using a plurality of pairs of feature vectors related to a first class; providing a sample feature vector related to a second class as an input to the model; receiving at least one synthesized feature vector as an output from the model; training a classifier to recognize the second class using a training data set comprising the sample feature vector related to the second class and the at least one synthesized feature vector; providing a query feature vector as an input to the classifier; and receiving output from the classifier that identifies the query feature vector as being related to the second class, wherein the output is used to perform an action. In certain embodiments, a computing system may be configured to perform methods described herein. In some embodiments, a non-transitory computer-readable medium may store instructions that, when executed by one or more processors, cause the one or more processors to perform methods described herein.

DETAILED DESCRIPTION

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

Figure 1:
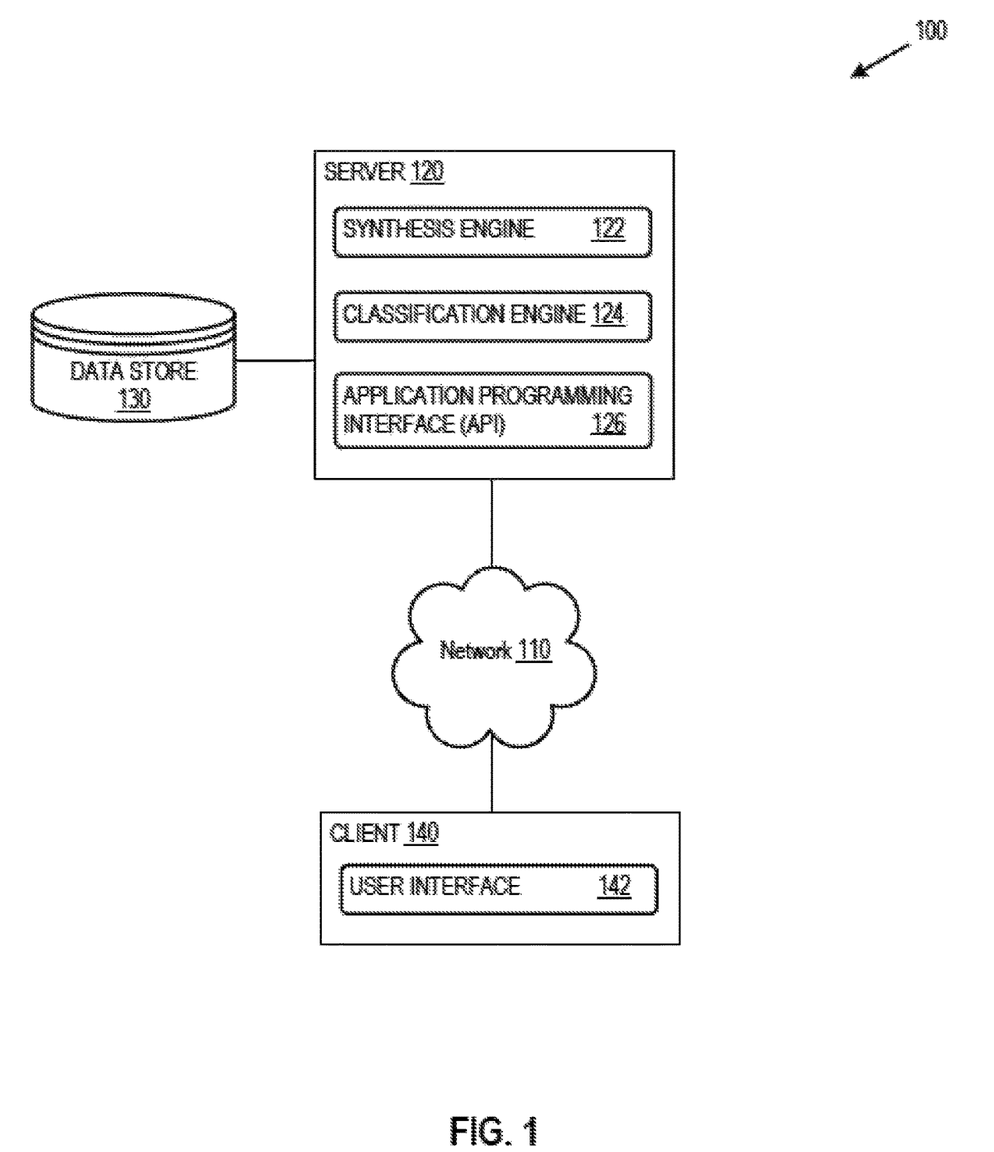
FIG. 1 depicts a computing environment in which embodiments of the present disclosure may be implemented.

FIG. 1 depicts a computing environment 100 in which embodiments of the present disclosure may be implemented. Computing environment 100 includes a server 120 and a client 140 connected via a network 110. Network 110 may include any type of connection that allows for the exchange of data between server 120 and client 140, such as a local area network (LAN), intranet, cellular data network, the Internet, or the like.

Server 120 is generally representative of a computing device such as a physical or virtual server, desktop computer, or other computing device. Server 120 comprises a synthesis engine 122 that generally performs operations related to training and using a synthesis model to synthesize feature vectors, a classification engine 124 that generally performs operations related to training and using a classifier to classify feature vectors, and an application programming interface (API) 124, which generally serves as an interface through which users (e.g., of client 140) interact with services provided by server 120, such as classification engine 124. Server 120 is connected to a data store 130, which generally represents a data storage entity (e.g., database, repository, or thee like) that stores content such as images, audio, video, text, and other content used in training synthesis models and classifiers according to embodiments described herein. Content in data store 130 may include classified data (e.g., known examples of a class) and unclassified data. It is noted that, while data store 130 is depicted separately from server 120, data store 130 may alternatively be included within server 120.

Client 140 is generally representative of a computing device such as a mobile phone, laptop computer, desktop computer, tablet, or the like. Client 140 comprises a user interface 142, which allows a user to provide input and receive output (e.g. via a display associated with client 140). In some embodiments, user interface 142 allows a user to interact with classification engine 124 of server 120 through API 124 (e.g., via API method calls). It is noted that, while user interface 142 is depicted as a component of client 140, user interface 142 may alternatively be located on server 120.

According to embodiments, synthesis engine 122 trains a synthesis model for synthesizing examples of a class. It is known that humans are particularly good at learning new categories on the go, from seeing just a few or even a single example of the category. This is especially evident in early childhood, when a parent points and names an object and a child can immediately start finding more of its kind in the surroundings. While the exact workings of the human brain are very far from being fully understood, one can conjecture that humans are likely to learn from analogies. That is, humans identify in new objects elements of some latent semantic structure that is present in other, already familiar categories, and use this structure to construct an internal classifier for the new category. Techniques described herein apply this concept to the field of computerized classification by using large sets of examples (instances) of known classes (represented in some latent semantic space) in order to learn to sample from distributions of new classes for which only one or a few examples are available. This is accomplished in certain embodiments by training a synthesis model, which may comprise a neural network, to sample from distributions of new categories, based on just a few observed examples.

In certain embodiments, training of the synthesis model is performed using stochastic gradient descent (SGD) algorithms applied to batches of training data for the synthesis model. For example, each batch may include a pair of feature vectors from the same category, drawn randomly from the set of training categories.

In some embodiments, synthesis engine 122 uses multiple pairs of feature vectors related to a first class to train the synthesis model to generate a synthesized feature vector based on a single feature vector related to a second class. A "feature vector" generally refers to a representation of features derived from a data instance, such as an image. For example, a feature vector may be determined from an image by extracting features from the image, which may involve the use of techniques such as scale invariant feature transform (SIFT), histogram of oriented gradients (HOG), Gist feature extraction, and others.

In certain embodiments, the synthesis model trained by synthesis engine 122 is an auto-encoder model that includes an encoder and a decoder. The encoder learns to extract transferable deformations between pairs of examples (e.g., feature vectors) of the same class, while the decoder learns how to apply these deformations to other examples in order to learn to sample from new classes. For the ease of notation, assume a single example Y belongs to a certain category C, and the goal is to learn to sample additional examples X belonging to the same category. In other words, we would like to learn to sample from the class posterior: P(X|C;Y). Notice that the conditioning on Y implies that the synthesis model may not learn to sample from the whole class posterior, but rather from its certain subset of "modes" that can be obtained from Y using the deformations the synthesis model learned to extract. A transferable deformation that is extracted by the synthesis model generally comprises a low-dimensional internal representation that encodes, intuitively, a difference between a pair of input feature vectors.

The encoder and decoder may be neural networks that each comprise a plurality of linear fully-connected layers, non-linearities, normalization layers, and/or regularization layers with rectified linear unit (ReLU) layers in between. In some examples, the input dimension of the encoder is $2 \cdot D_f$, where $D_f$ is the dimension of the feature vector (e.g., which may be the same for all the sample feature vectors of all classes). The output dimension of the encoder, $D_Z$, is generally much smaller than $D_f$. In one particular example, $D_f=2048$ and $D_Z=16$. The input dimension of the decoder may be, correspondingly, $D_Z+D_f$, and the output dimension of the encoder may be $D_f$. The number of linear layers in both the encoder and the decoder is typically small, such as 1-3, and the size of each such layer is typically larger, such as 2048-8192.

In one example, a pair of feature vectors associated with a first class (e.g., representing two different images known to contain dogs) are provided to the encoder, which extracts a transferable deformation between the pair (e.g., representing the differences between the two images) such that the decoder can reconstruct a first feature vector of the pair if given the second feature vector of the pair and the transferable deformation. Accordingly, the transferable deformation can be used in conjunction with a single feature vector associated with a second class (e.g., representing an image known to contain a cat) to generate a synthesized feature vector associated with the second class (e.g., representing a synthetic variation on the image known to contain a cat). The synthesized feature vector associated with the second class can then be used to augment a training data set related to the second class.

According to embodiments, classification engine 124 trains a classifier using a training data set that includes one or more synthesized feature vectors generated by synthesis engine 122. The classifier may comprise a neural network that is trained using supervised learning techniques to classify feature vectors based on known examples of classes. For example, the classifier may be a linear classifier. Using training data sets augmented with synthesized feature vectors allows for improved classification, particularly with respect to classes for which limited example feature vectors are available. For instance, it may be difficult for the classifier to classify an image as containing a cat if only a single example image of a cat is included in training data. As such, using synthesis engine 122 to synthesize a plurality of additional images (or, rather, feature vectors representing images) containing cats based on transferable deformations learned from a large existing set of images containing dogs may vastly improve the efficacy of the training data for the class of "cat".

Embodiments of the present disclosure may involve the use of various machine learning techniques. Machine learning models, such as neural networks, are generally trained using a training data set that includes training inputs that are associated with particular training outputs. For example, certain features that are historically associated with a particular output in a data set are used to train the model.

Once trained using a training data set for a particular class, the classifier is used to recognize the class in a previously unclassified feature vector. In one embodiment, a user of client 140 initiates a classification process for a given data instance (e.g., an image), such as through input to user interface 142, and client 140 transmits a request to classify the image to classification engine 124, such as via a call to a method of API 126. Classification engine 124 provides a feature vector representing the data instance as an input to the trained classifier, which outputs a classification. In some embodiments, the classifier outputs a score that indicates a strength of association between the feature vector and a certain class, such as a confidence score. Classification engine 122 may then provide the classification and/or score back to user interface 142, such as via a response to the request sent from client 140 via API 126.

Client 140 may use the classification in a variety of different ways. For example, the classification may be used to sort images, identify people, objects, or places present in images or videos, identify a song or a voice in an audio recording, identify a topic or other contents present in text, and for a variety of other purposes.

Embodiments of the present disclosure constitute an improvement over conventional techniques for classifying data, such as those involving the use of only existing known examples of classes. The ability to automatically augment a training data set for a classifier using data synthesized based on a single example or a small number of examples of a class allows for improved classification. Furthermore, using an existing set of data related to one class to synthesize additional examples of another class improves the efficiency of training data generation, as it reduces the amount of existing examples of a class that need to be gathered. The ability to automatically determine a measure of correlation between a word or phrase and a class based on a weakly-supervised machine learning process allows for improved automatic determinations, such as automatically selecting content to provide to users, filtering content, providing automated customer support, and identifying user characteristics such as age or level of expertise.

Figure 2:
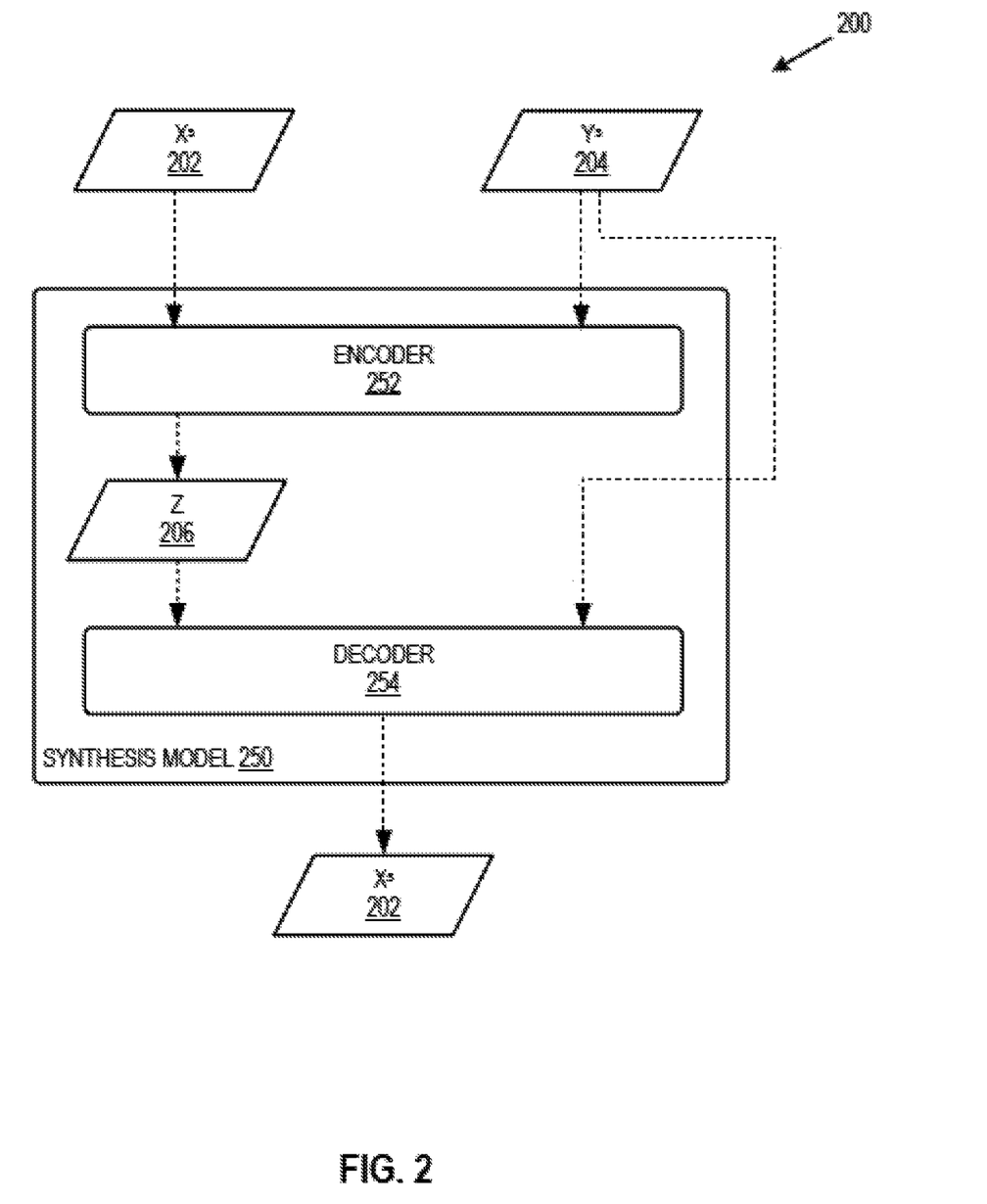
FIG. 2 depicts an example of training a synthesis model, according to embodiments of the present disclosure.

FIG. 2 depicts an example 200 of training a synthesis model, according to embodiments of the present disclosure. For instance, example 200 may represent operations performed by synthesis engine 122 of FIG. 1.

In example 200, a synthesis model 250 comprises an encoder 252 and a decoder 254. Feature vectors $X^s$ 202 and $Y^s$ 204 represent a pair of feature vectors that are associated with a "seen" (e.g., known) class. For instance feature vectors $X^s$ 202 and $Y^s$ 204 may represent a pair of images known to include dogs. Feature vectors $X^s$ 202 and $Y^s$ 204 are provided as inputs to encoder 252, which determines a deformation Z 206 between feature vector $X^s$ 202 and feature vector $Y^s$ 204.

Because deformation Z 206 represents a difference between feature vectors $X^s$ 202 and $Y^s$ 204, either of these feature vectors can be used in combination with deformation Z 206 to reconstruct the other feature vector. For instance, as shown in example 200, deformation Z 206 and feature vector $Y^s$ 204 are provided to decoder 254, which reconstructs feature vector $X^s$ 202. As such, synthesis model 250 is trained to extract transferable deformations between pairs of examples of the same class and apply these deformations to examples of new classes in order to synthesize examples of the new classes.

Figure 3:
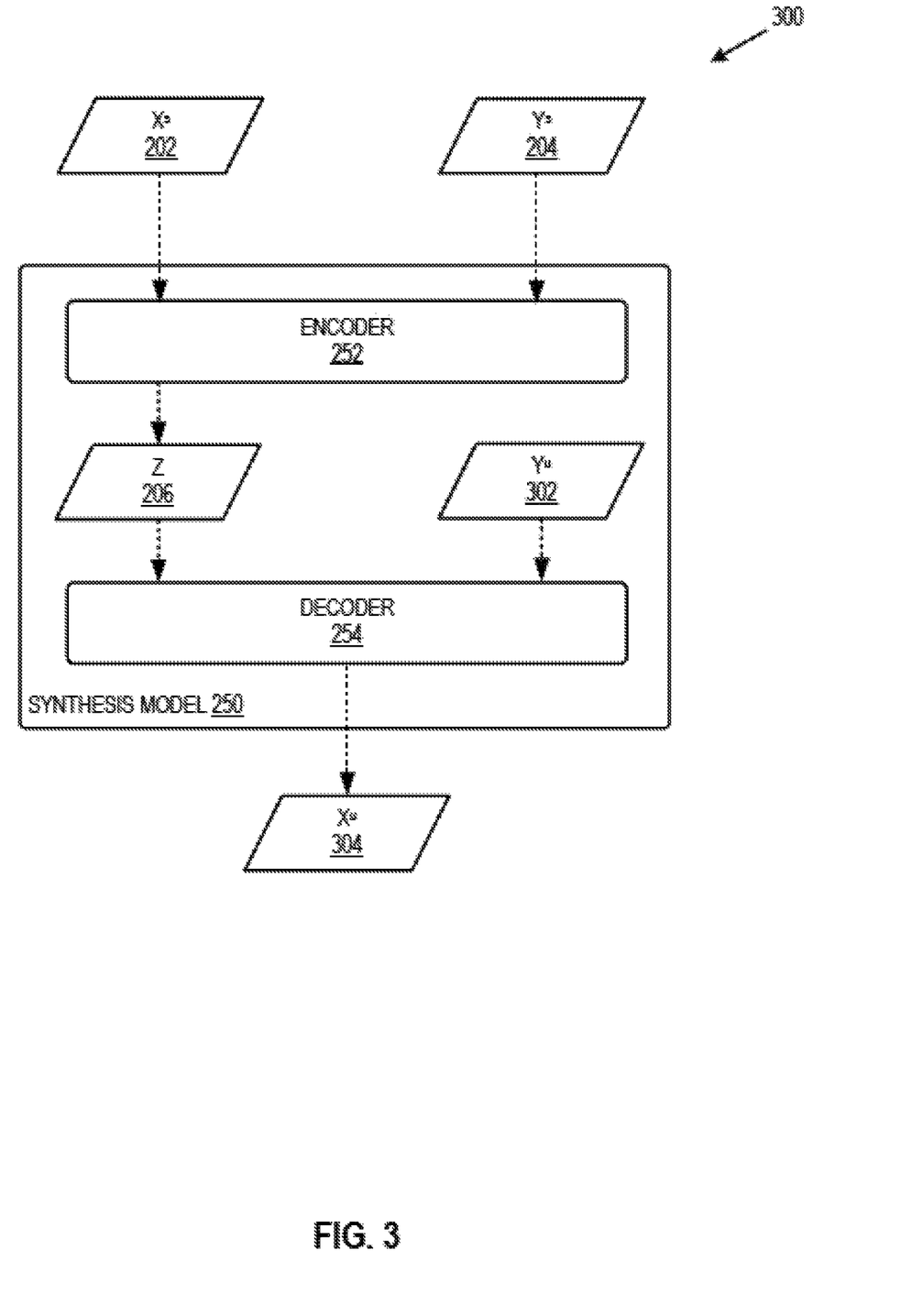
FIG. 3 depicts an example of synthesizing a feature vector, according to embodiments of the present disclosure.

FIG. 3 depicts an example 300 of synthesizing a feature vector, according to embodiments of the present disclosure. Example 200 includes model 250 comprising encoder 252 and decoder 254, as well as feature vectors $X^s$ 202 and $Y^s$ 204 and deformation Z 206, of FIG. 2. Example 200 may represent operations performed by synthesis engine 122 of FIG. 1.

In example 300, feature vectors $X^s$ 202 and $Y^s$ 204 are provided as inputs to encoder 252, which determines a deformation Z 206 between feature vector $X^s$ 202 and feature vector $Y^s$ 204. Deformation Z 206 represents a difference between feature vectors $X^s$ 202 and $Y^s$ 204. Feature vector $Y^u$ 302 is a feature vector associated with an "unseen" (e.g., unknown) class. For instance, feature vector $Y^u$ 302 may represent an image known to contain a cat, and may be the only available image known to contain a cat. Deformation Z 206 and feature vector $Y^u$ 302 are provided to decoder 254, which generates a synthesized feature vector $X^u$ 304. As such, synthesis model 250 applies a deformation extracted from a pair of images of a seen class to a single example of an unseen class in order to synthesize an example of the unseen class. Feature vector $X^u$ 304 may, for example, be used to augment a training data set for the "unseen" class so that a classifier can be trained to more effectively recognize the "unseen" class in new feature vectors.

Figure 4:
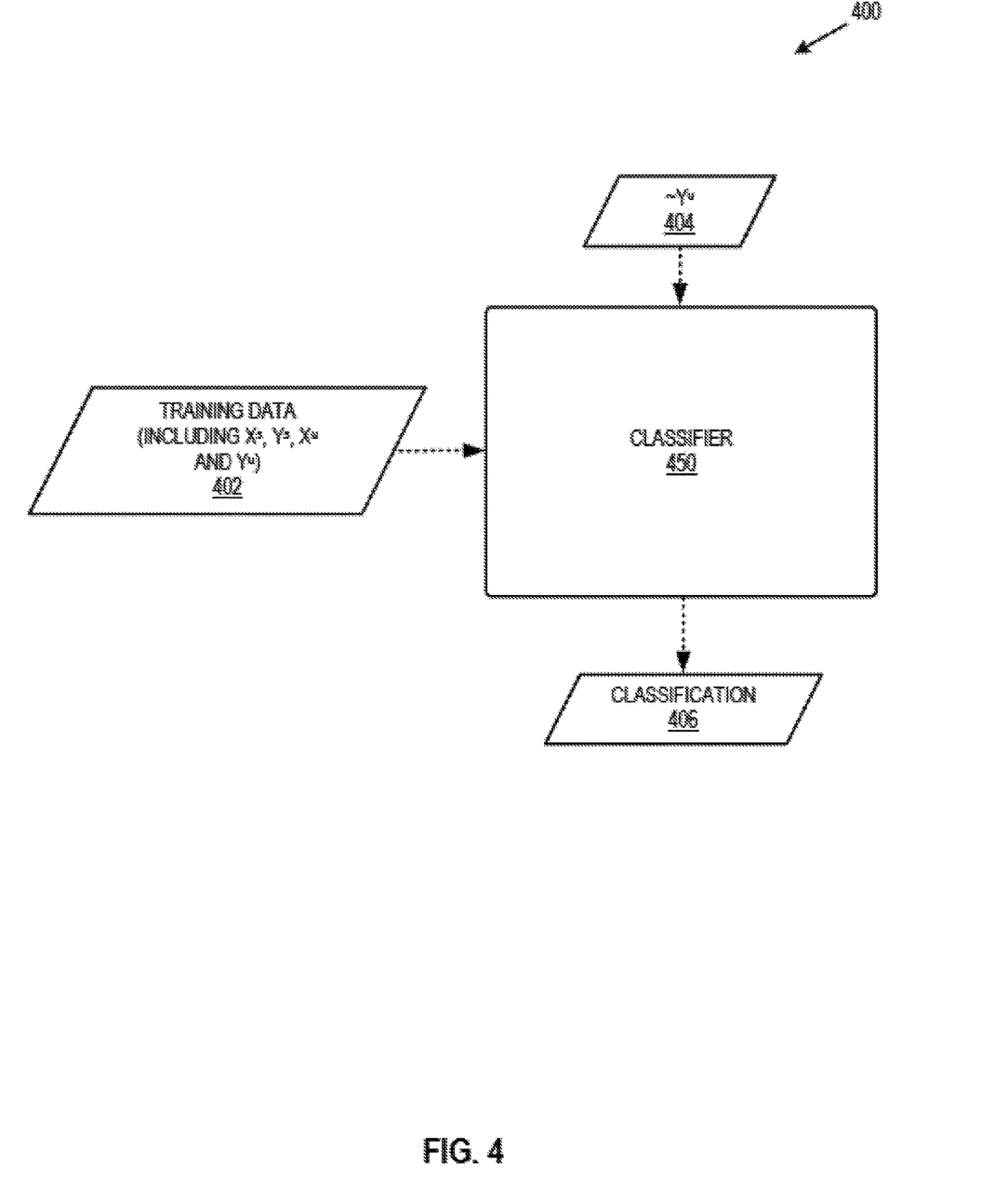
FIG. 4 depicts an example of training a classifier to classify a feature vector, according to embodiments of the present disclosure.

FIG. 4 depicts an example 400 of training a classifier to classify a feature vector, according to embodiments of the present disclosure. For instance, example 400 may represent operations performed by classification engine 124 of FIG. 1.

Example 400 includes a classifier 450, which may comprise a machine learning model (e.g., a neural network). Training data 402 generally represents a set of feature vectors related to a certain class (e.g., the "unseen" class of FIG. 3). Training data 402 includes synthesized feature vector $X^u$ 304 and feature vector $Y^u$ 302 of FIG. 3. For instance, training data 403 may have been augmented using one or more synthesized feature vectors (e.g., synthesized feature vector $X^u$ 304 of FIG. 3) generated using a process such as that described with respect to FIG. 3 above.

In example 400, training data 402 is used to train classifier 450. For instance, classifier 450 may be trained using supervised machine learning techniques based on the feature vectors in training data 402 to classify feature vectors as being associated with the "unseen" class. The training data may include a plurality of feature vectors, such as $X^s$, $Y^s$, $X^u$ and $Y^u$ of FIG. 3.

A "query" feature vector $\sim Y^u$ 404 is provided as an input to classifier 450. For instance, query feature vector $\sim Y^u$ 404 may represent a new, unclassified image (e.g., it is provided as a query to classifier 450). Classifier 450 may determine, based on its training, that query feature vector $\sim Y^u$ 404 is associated with the "unseen" class (e.g., that query feature vector $\sim Y^u$ 404 represents an image that contains a cat). Classifier 450 outputs classification 406, which identifies a class associated with query feature vector $\sim Y^u$ 404. In some embodiments, classification 406 includes a score representing a confidence or strength of association between query feature vector $\sim Y^u$ 404 and the class.

As described above, classification 406 may be used for a variety of purposes, such as determining objects or people present in images, selecting search results (e.g., identifying content associated with a particular class), and/or the like.

Figure 5:
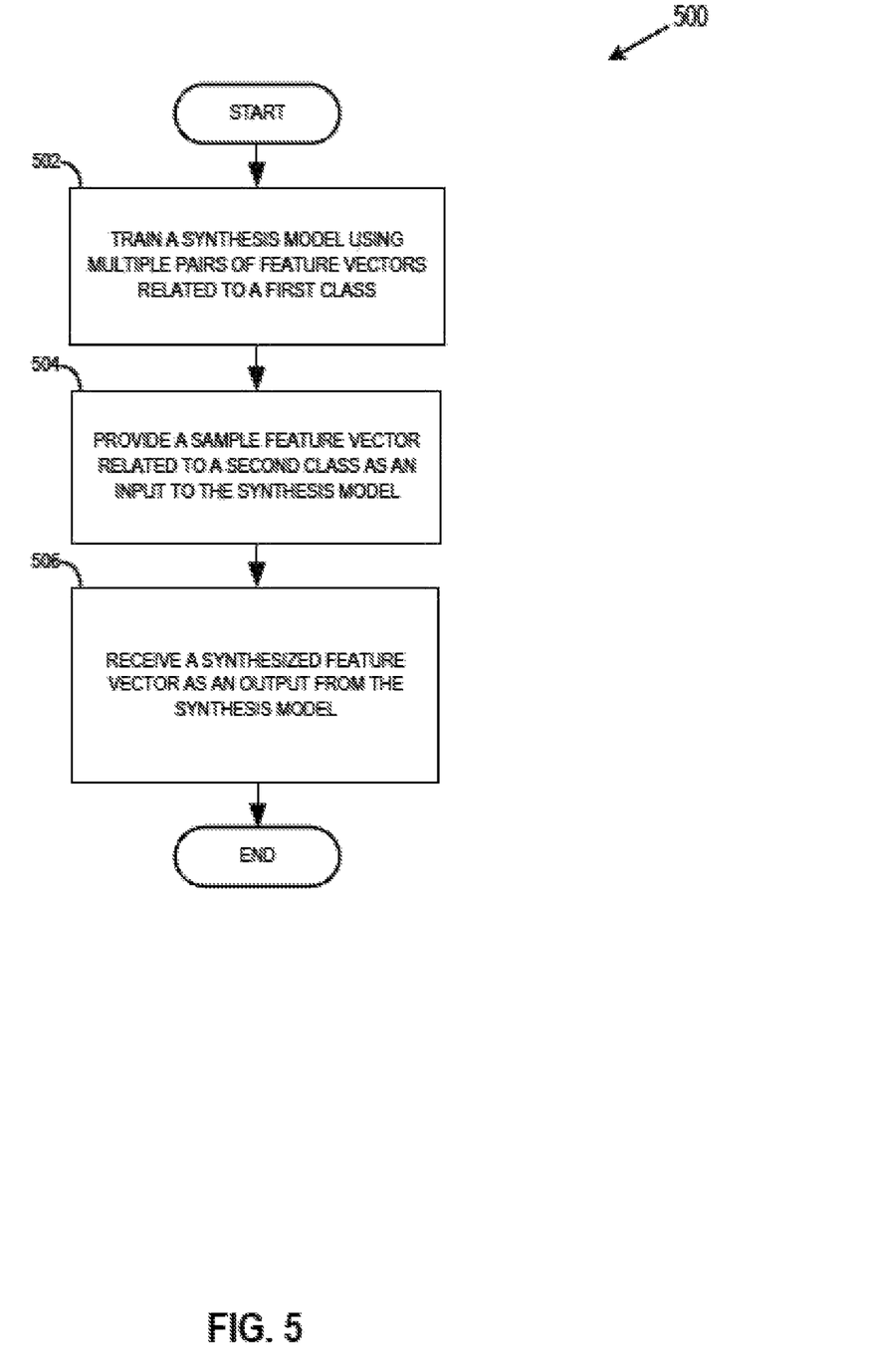
FIG. 5 depicts example operations related to synthesizing feature vectors to augment training data, according to embodiments of the present disclosure.

FIG. 5 depicts example operations 500 related to synthesizing feature vectors to augment training data, according to embodiments of the present disclosure. For instance, operations 500 may be performed by synthesis engine 122 of FIG. 1.

At 502, a synthesis model is trained using multiple pairs of feature vectors related to a first class. For instance, the synthesis model may be trained using techniques such as those described above with respect to FIG. 2.

At 504, a sample feature vector related to a second class is provided as an input to the synthesis model (e.g., after training the synthesis model at 502). For instance the sample feature vector may be one of a small number of existing feature vectors related to the second class.

At 506, a synthesized feature vector is received as an output from the synthesis model. For instance, the synthesis model may use techniques such as those described above with respect to FIG. 3 to generate a synthesized feature vector related to the second class based on the sample feature vector.

The synthesized feature vector may be used to augment a training data set related to the second class.

Figure 6:
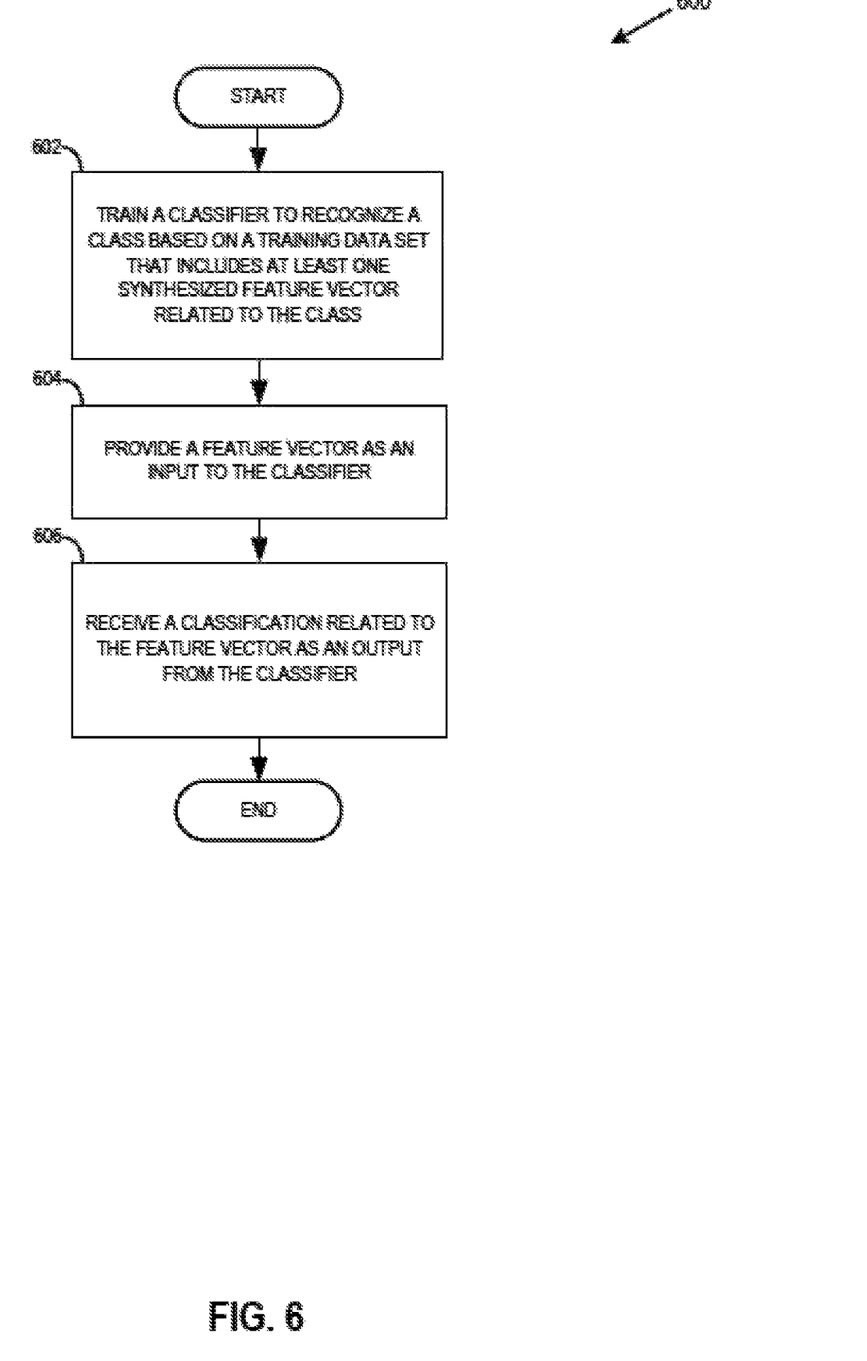
FIG. 6 depicts example operations related to classifying a feature vector, according to embodiments of the present disclosure.

FIG. 6 depicts example operations 600 related to classifying a feature vector, according to embodiments of the present disclosure. For instance, operations 500 may be performed by classification engine 124 of FIG. 1.

AT 602, a classifier is trained to recognize a class based on a training data set that includes at least one synthesized feature vector related to the class. For instance, operations 600 may be performed following operations 500 of FIG. 5, and the training data set may include the synthesized feature vector received at 506 of FIG. 5. It is noted that in some instances the training data set may be augmented with a large number of synthesized feature vectors rather than with only a single synthesized feature vector.

At 604, a feature vector is provided as an input to the classifier. For example, the feature vector may be a previously unclassified feature vector.

At 606, a classification related to the feature vector is received as an output from the classifier. For instance, the classifier may classify the feature vector as described above with respect to FIG. 4. The classification may identify a class (e.g., which may be the class related to the training data set at 602) and/or a score representing a strength of association between the feature vector and the class. The classification may be used to perform one or more actions, such as identifying contents, including people, objects, and places, present in an image or video represented by the feature vector. Other uses for the classification include identifying contents, such as a song or voice, present in audio represented by the feature vector and identifying contents, such as topics, authors, themes, and sentiments, of text represented by the feature vector. It is noted that these uses for the classification are only included as examples, and a variety of other uses are possible.

Figure 7:
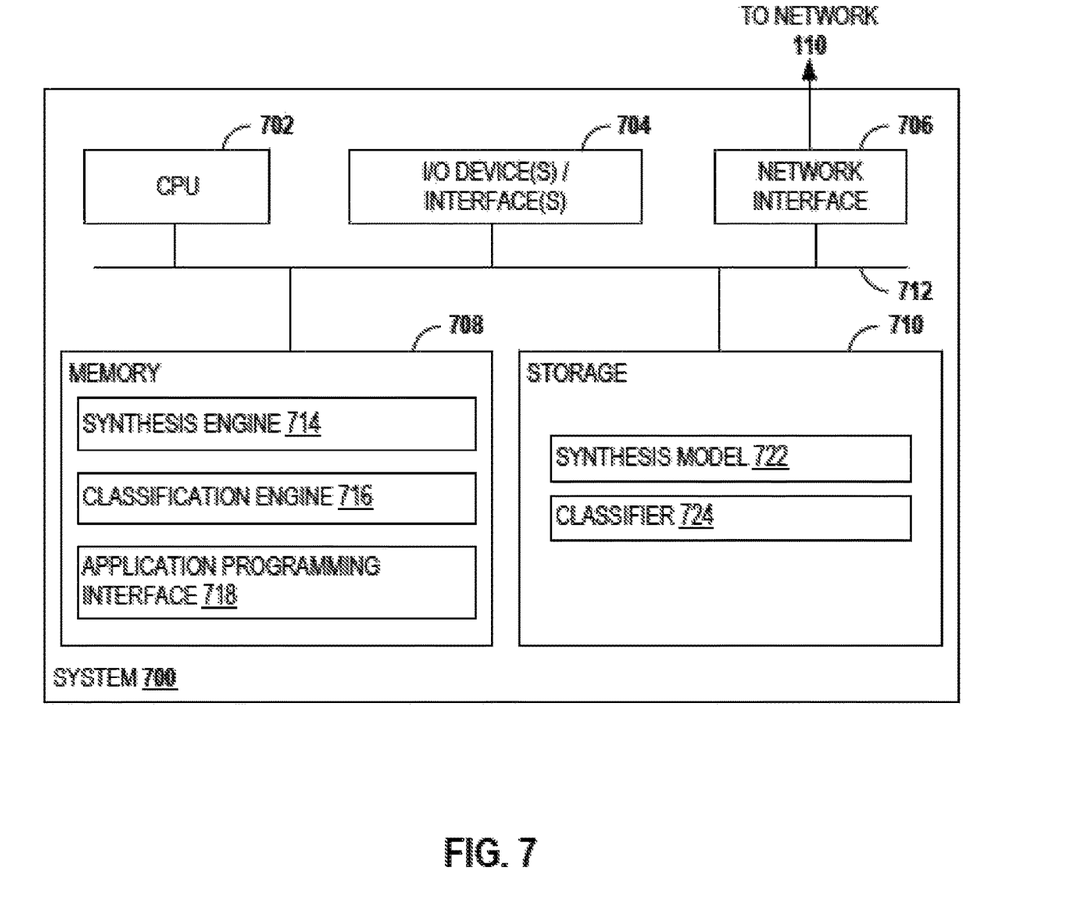
FIG. 7 depicts a computing system with which embodiments of the present disclosure may be implemented.

FIG. 7 depicts a computing system 700 with which embodiments of the present disclosure may be implemented. For example, computing system 700 may represent server 120 of FIG. 1.

System 700 includes a central processing unit (CPU) 702, one or more I/O device interfaces 704 (that may provide connections for various I/O devices 704, such as keyboards, displays, mouse devices, and the like) to the system 700, network interface 706 (e.g., a physical network interface card), memory 708, storage 710, and an interconnect 712. It is noted that one or more components of system 700 may alternatively be located remotely and accessed via a network, such as network 110. It is further contemplated that one or more components of system 700 may comprise physical or virtualized components.

CPU 702 may receive and execute instructions stored in memory 708. Similarly, the CPU 702 may receive and store data related to applications in memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and other arrangements.

Additionally, the memory 708 may represent a random access memory. Storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

Storage 710 comprises synthesis model 722 and classifier 724. For example, synthesis model 722 may represent synthesis model 250 of FIGS. 2 and 3 and classifier 724 may represent classifier 450 of FIG. 4.

As shown, memory 708 includes synthesis engine 714, classification engine 716, and API 718, which may be representative of synthesis engine 122, classification engine 124, and API 126 of FIG. 1.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a synthesis engine and/or classification engine as described herein) or related data available in the cloud. For example, the synthesis engine and classification engine could execute on a computing system in the cloud to synthesize training data and train a classifier to classify feature vectors. In such a case, the classification engine could classify a feature vector and store the classification at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
    training a model using a plurality of pairs of feature vectors related to a first class;
    providing a sample feature vector related to a second class as an input to the model;
    receiving at least one synthesized feature vector as an output from the model;
    training a classifier to recognize the second class using a training data set comprising the sample feature vector related to the second class and the at least one synthesized feature vector;
    providing a query feature vector as an input to the classifier; and
    receiving output from the classifier that identifies the query feature vector as being related to the second class, wherein the output is used to perform an action.

2. The method of claim 1, wherein the model comprises an encoder and a decoder.

3. The method of claim 1, wherein the action comprises one of:
    identifying contents of an image that is represented by the query feature vector;
    identifying contents of a video that is represented by the query feature vector;
    identifying contents of audio represented by the query feature vector; or
    identifying contents of text represented by the query feature vector.

4. The method of claim 1, wherein the plurality of pairs of feature vectors, the sample feature vector, the synthesized feature vector, and the query feature vector comprise images.

5. The method of claim 1, wherein the classifier comprises a plurality of layers selected from the following: linear fully-connected layers; non-linearities; normalization layers; and regularization layers.

6. The method of claim 1, wherein training the model comprises learning, using an encoder, to produce a low-dimensional internal representation encoding a difference between a first feature vector of a pair of the plurality of pairs of feature vectors and a second feature vector of the pair.

7. The method of claim 2, wherein training the model comprises using a stochastic gradient descent (SGD) algorithm on each pair of the plurality of pairs of feature vectors.

8. The method of claim 2, wherein an input dimension of the encoder is two times a dimension of the sample feature vector, and wherein an output dimension of the encoder is smaller than the input dimension of the encoder.

9. The method of claim 6, wherein the model generates the at least one synthesized feature vector by using a decoder to apply the difference between the first feature vector and the second feature vector to the sample feature vector related to the second class.

10. The method of claim 8, wherein an input dimension of the decoder is a sum of a dimension of the sample feature vector and the output dimension of the encoder, and wherein an output dimension of the decoder is the dimension of the sample feature vector.

11. A system, comprising:
one or more processors; and
a computer-readable storage medium having computer-readable program code embodied therewith, the computer-readable program code executable by one or more computer processors to perform a method, the method comprising:
training a model using a plurality of pairs of feature vectors related to a first class;
providing a sample feature vector related to a second class as an input to the model;
receiving at least one synthesized feature vector as an output from the model;
training a classifier to recognize the second class using a training data set comprising the sample feature vector related to the second class and the at least one synthesized feature vector;
providing a query feature vector as an input to the classifier; and
receiving output from the classifier that identifies the query feature vector as being related to the second class, wherein the output is used to perform an action.

12. The system of claim 11, wherein the model comprises an encoder and a decoder.

13. The system of claim 11, wherein the action comprises one of:

identifying contents of an image that is represented by the query feature vector;
identifying contents of a video that is represented by the query feature vector;
identifying contents of audio represented by the query feature vector; or
identifying contents of text represented by the query feature vector.

14. The system of claim 11, wherein the plurality of pairs of feature vectors, the sample feature vector, the synthesized feature vector, and the query feature vector comprise images.

15. The system of claim 11, wherein the classifier comprises a plurality of layers selected from the following: linear fully-connected layers; non-linearities; normalization layers; and regularization layers.

16. The system of claim 11, wherein training the model comprises learning, using an encoder, to produce a low-dimensional internal representation encoding a difference between a first feature vector of a pair of the plurality of pairs of feature vectors and a second feature vector of the pair.

17. The system of claim 12, wherein training the model comprises using a stochastic gradient descent (SGD) algorithm on each pair of the plurality of pairs of feature vectors.

18. The system of claim 12, wherein an input dimension of the encoder is two times a dimension of the sample feature vector, and wherein an output dimension of the encoder is smaller than the input dimension of the encoder.

19. The system of claim 18, wherein an input dimension of the decoder is a sum of a dimension of the sample feature vector and the output dimension of the encoder, and wherein an output dimension of the decoder is the dimension of the sample feature vector.

20. A computer program product, the computer program product comprising:
a computer-readable storage medium having computer-readable program code embodied therewith, the computer-readable program code executable by one or more computer processors to perform a method, the method comprising:
training a model using a plurality of pairs of feature vectors related to a first class;
providing a sample feature vector related to a second class as an input to the model;
receiving at least one synthesized feature vector as an output from the model;
training a classifier to recognize the second class using a training data set comprising the sample feature vector related to the second class and the at least one synthesized feature vector;
providing a query feature vector as an input to the classifier; and
receiving output from the classifier that identifies the query feature vector as being related to the second class, wherein the output is used to perform an action.

* * * * *